(12) United States Patent
Geil

(10) Patent No.: US 9,503,450 B2
(45) Date of Patent: Nov. 22, 2016

(54) LOGIN SECURITY WITH SHORT MESSAGING

(71) Applicant: TeleCommunication Systems, Inc., Annapolis, MD (US)

(72) Inventor: Phillip W. Geil, Clarksville, MD (US)

(73) Assignee: Telecommunications Systems, Inc., Annapolis, MD (US)

( * ) Notice: Subject to any disclaimer, the term of this patent is extended or adjusted under 35 U.S.C. 154(b) by 80 days.

(21) Appl. No.: 14/261,777

(22) Filed: Apr. 25, 2014

(65) Prior Publication Data

US 2014/0237575 A1    Aug. 21, 2014

Related U.S. Application Data

(63) Continuation of application No. 12/591,935, filed on Dec. 4, 2009, now Pat. No. 8,712,453.

(60) Provisional application No. 61/193,792, filed on Dec. 23, 2008.

(51) Int. Cl.
| | |
|---|---|
| *H04L 29/06* | (2006.01) |
| *H04W 4/00* | (2009.01) |
| *H04L 12/58* | (2006.01) |
| *H04W 4/14* | (2009.01) |
| *H04W 8/26* | (2009.01) |
| *H04W 68/00* | (2009.01) |

(52) U.S. Cl.
CPC ......... *H04L 63/083* (2013.01); *H04L 12/5895* (2013.01); *H04L 51/38* (2013.01); *H04L 63/18* (2013.01); *H04W 4/14* (2013.01); *H04W 8/26* (2013.01); *H04W 68/00* (2013.01)

(58) Field of Classification Search
CPC ................. H04L 12/5895; H04L 51/38; H04L 63/083; H04L 63/18; H04W 68/00
USPC .............................................. 726/7; 455/466
See application file for complete search history.

(56) References Cited

U.S. PATENT DOCUMENTS

| | | | |
|---|---|---|---|
| 1,103,073 | A | 7/1914 | O'Connel |
| 3,400,222 | A | 9/1968 | Nightingale |
| 3,920,908 | A | 11/1975 | Kraus |
| 4,310,726 | A | 1/1982 | Asmuth |
| 4,399,330 | A | 8/1983 | Kuenzel |
| 4,494,119 | A | 1/1985 | Wimbush |
| 4,651,156 | A | 3/1987 | Martinez |
| 4,680,785 | A | 7/1987 | Akiyama |

(Continued)

OTHER PUBLICATIONS

"Technology Rides Control Network to Support Short Package Applications"; Advanced Intelligent Network New. Washington, DC: Mar. 19, 1997. vol. 7, Iss. 6; p. 1.

(Continued)

*Primary Examiner* — William Nealon
(74) *Attorney, Agent, or Firm* — Tarolli, Sundheim, Covell & Tummino LLP

(57) ABSTRACT

Additional security is provided for on-line account users beyond that which is otherwise conventionally provided by, e.g., longer passwords, passwords that include both characters and numbers, etc., by implementing an on-line server that notifies a pre-registered account holder via a short messaging system (SMS) with a short message login notification when a log-in (or even just a login attempt) occurs. Thus, even entry of the proper user/password information, which would conventionally be presumed to be authorized, will be notified to the registered SM address of the authorized user.

4 Claims, 3 Drawing Sheets

(56) References Cited

U.S. PATENT DOCUMENTS

| | | |
|---|---|---|
| 4,706,275 A | 11/1987 | Kamil |
| 4,725,719 A | 2/1988 | Oncken |
| 4,756,020 A | 7/1988 | Fodale |
| 4,776,000 A | 10/1988 | Parienti |
| 4,776,003 A | 10/1988 | Harris |
| 4,776,037 A | 10/1988 | Rozanski, Jr. |
| 4,831,647 A | 5/1989 | D'Avello |
| 4,852,149 A | 7/1989 | Zwick |
| 4,852,155 A | 7/1989 | Barraud |
| 4,860,341 A | 8/1989 | D'Avello |
| 4,891,638 A | 1/1990 | Davis |
| 4,891,650 A | 1/1990 | Sheffer |
| 4,901,340 A | 2/1990 | Parker |
| 4,935,956 A | 6/1990 | Hellwarth |
| 4,952,928 A | 8/1990 | Carroll et al. |
| 5,003,585 A | 3/1991 | Richer |
| 5,014,206 A | 5/1991 | Scribner et al. |
| 5,043,736 A | 8/1991 | Darnell et al. |
| 5,046,088 A | 9/1991 | Margulies |
| 5,055,851 A | 10/1991 | Sheffer |
| 5,063,588 A | 11/1991 | Patsiokas |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori et al. |
| 5,103,449 A | 4/1992 | Jiolissaint |
| 5,119,104 A | 6/1992 | Heller |
| 5,127,040 A | 6/1992 | D'Avello |
| 5,128,938 A | 7/1992 | Borras |
| 5,138,648 A | 8/1992 | Palomegue |
| 5,138,650 A | 8/1992 | Stahl |
| 5,144,283 A | 9/1992 | Arens et al. |
| 5,144,649 A | 9/1992 | Zicker |
| 5,150,113 A | 9/1992 | Bluthgen et al. |
| 5,159,625 A | 10/1992 | Zicker |
| 5,161,180 A | 11/1992 | Chavous |
| 5,177,478 A | 1/1993 | Wagai et al. |
| 5,187,710 A | 2/1993 | Chau |
| 5,193,215 A | 3/1993 | Olmer |
| 5,208,756 A | 5/1993 | Song |
| 5,214,789 A | 5/1993 | George et al. |
| 5,216,703 A | 6/1993 | Roy |
| 5,218,367 A | 6/1993 | Sheffer et al. |
| 5,220,593 A | 6/1993 | Zicker |
| 5,223,844 A | 6/1993 | Mansell et al. |
| 5,233,642 A | 8/1993 | Renton |
| 5,235,630 A | 8/1993 | Moody et al. |
| 5,239,570 A | 8/1993 | Koster et al. |
| 5,265,155 A | 11/1993 | Castro |
| 5,265,630 A | 11/1993 | Hartmann |
| 5,266,944 A | 11/1993 | Carroll et al. |
| 5,274,802 A | 12/1993 | Altine |
| 5,276,444 A | 1/1994 | McNair |
| 5,289,527 A | 2/1994 | Tiedemann, Jr. |
| 5,291,543 A | 3/1994 | Freese |
| 5,293,642 A | 3/1994 | Lo |
| 5,297,189 A | 3/1994 | Chabernaud |
| 5,299,132 A | 3/1994 | Wortham |
| 5,301,223 A | 4/1994 | Amadon |
| 5,301,234 A | 4/1994 | Mazziotto |
| 5,309,501 A | 5/1994 | Kozik |
| 5,311,572 A | 5/1994 | Friedes |
| 5,321,735 A | 6/1994 | Breeden |
| 5,325,302 A | 6/1994 | Izidon et al. |
| 5,325,418 A | 6/1994 | McGregor |
| 5,327,144 A | 7/1994 | Stilp |
| 5,329,578 A | 7/1994 | Brennan |
| 5,334,974 A | 8/1994 | Simms et al. |
| 5,339,352 A | 8/1994 | Armstrong |
| 5,341,410 A | 8/1994 | Aron |
| 5,341,414 A | 8/1994 | Popke |
| 5,343,493 A | 8/1994 | Karimullah |
| 5,347,568 A | 9/1994 | Moody et al. |
| 5,351,235 A | 9/1994 | Lahtinen |
| 5,353,335 A | 10/1994 | D'Urso |
| 5,359,182 A | 10/1994 | Schilling |
| 5,359,642 A | 10/1994 | Castro |
| 5,361,212 A | 11/1994 | Class et al. |
| 5,363,425 A | 11/1994 | Mufti et al. |
| 5,369,699 A | 11/1994 | Page |
| 5,374,936 A | 12/1994 | Feng |
| 5,379,451 A | 1/1995 | Nakagoshi et al. |
| 5,381,338 A | 1/1995 | Wysocki et al. |
| 5,384,825 A | 1/1995 | Dillard |
| 5,387,993 A | 2/1995 | Heller et al. |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,396,545 A | 3/1995 | Nair |
| 5,396,558 A | 3/1995 | Ishiguro et al. |
| 5,398,190 A | 3/1995 | Wortham |
| 5,404,580 A | 4/1995 | Simpson |
| 5,406,614 A | 4/1995 | Hara |
| 5,408,513 A | 4/1995 | Busch, Jr. |
| 5,408,519 A | 4/1995 | Pierce |
| 5,408,682 A | 4/1995 | Ranner |
| 5,412,726 A | 5/1995 | Nevoux |
| 5,418,537 A | 5/1995 | Bird |
| 5,423,076 A | 6/1995 | Westergreen et al. |
| 5,432,841 A | 7/1995 | Rimer |
| 5,434,789 A | 7/1995 | Fraker et al. |
| 5,438,615 A | 8/1995 | Moen |
| 5,440,621 A | 8/1995 | Castro |
| 5,454,024 A | 9/1995 | Lebowitz |
| 5,457,737 A | 10/1995 | Wen |
| 5,461,390 A | 10/1995 | Hoshen |
| 5,465,289 A | 11/1995 | Kennedy, Jr. |
| 5,469,497 A | 11/1995 | Pierce |
| 5,470,233 A | 11/1995 | Fuchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer et al. |
| 5,485,505 A | 1/1996 | Norman |
| 5,488,563 A | 1/1996 | Chazelle et al. |
| 5,494,091 A | 2/1996 | Freeman |
| 5,497,149 A | 3/1996 | Fast |
| 5,502,761 A | 3/1996 | Duncan |
| 5,506,893 A | 4/1996 | Buscher |
| 5,508,931 A | 4/1996 | Snider |
| 5,509,056 A | 4/1996 | Ericsson |
| 5,513,243 A | 4/1996 | Kage |
| 5,515,287 A | 5/1996 | Hakoyama et al. |
| 5,517,555 A | 5/1996 | Amadon |
| 5,517,559 A | 5/1996 | Hayashi |
| 5,519,403 A | 5/1996 | Bickley et al. |
| 5,532,690 A | 7/1996 | Hertel |
| 5,535,434 A | 7/1996 | Siddoway et al. |
| 5,539,398 A | 7/1996 | Hall et al. |
| 5,543,776 A | 8/1996 | L'esperance et al. |
| 5,550,897 A | 8/1996 | Seiderman |
| 5,552,772 A | 9/1996 | Janky et al. |
| 5,555,286 A | 9/1996 | Tendler |
| 5,568,119 A | 10/1996 | Schipper et al. |
| 5,570,416 A | 10/1996 | Kroll |
| 5,574,648 A | 11/1996 | Pilley |
| 5,577,100 A | 11/1996 | McGregor |
| 5,579,372 A | 11/1996 | Astrom |
| 5,579,376 A | 11/1996 | Kennedy |
| 5,583,918 A | 12/1996 | Nakagawa |
| 5,586,175 A | 12/1996 | Hogan |
| 5,588,009 A | 12/1996 | Will |
| 5,592,535 A | 1/1997 | Klotz |
| 5,604,486 A | 2/1997 | Lauro et al. |
| 5,606,313 A | 2/1997 | Allen et al. |
| 5,606,850 A | 3/1997 | Nakamura |
| 5,610,815 A | 3/1997 | Gudat et al. |
| 5,610,972 A | 3/1997 | Emery |
| 5,614,890 A | 3/1997 | Fox |
| 5,615,116 A | 3/1997 | Gudat et al. |
| 5,621,793 A | 4/1997 | Bednarek et al. |
| 5,625,669 A | 4/1997 | McGregor |
| 5,628,051 A | 5/1997 | Salin |

(56) References Cited

U.S. PATENT DOCUMENTS

| | | |
|---|---|---|
| 5,633,912 A | 5/1997 | Tsoi |
| 5,640,447 A | 6/1997 | Fonseca |
| 5,673,306 A | 9/1997 | Amadon |
| 5,682,600 A | 10/1997 | Salin |
| 5,692,037 A | 11/1997 | Friend |
| 5,722,067 A | 2/1998 | Fougnies |
| 5,732,346 A | 3/1998 | Lazaridis |
| 5,740,534 A | 4/1998 | Ayerst et al. |
| 5,761,618 A | 6/1998 | Lynch et al. |
| 5,767,795 A | 6/1998 | Schaphorst |
| 5,768,509 A | 6/1998 | Gunluk |
| 5,774,533 A | 6/1998 | Patel |
| 5,778,313 A | 7/1998 | Fougnies |
| 5,787,357 A | 7/1998 | Salin |
| 5,790,636 A | 8/1998 | Marshall |
| 5,793,859 A | 8/1998 | Matthews |
| 5,794,142 A | 8/1998 | Vanttila et al. |
| 5,797,091 A | 8/1998 | Clise et al. |
| 5,797,094 A | 8/1998 | Houde et al. |
| 5,797,096 A | 8/1998 | Lupien et al. |
| 5,802,492 A | 9/1998 | DeLorme et al. |
| 5,806,000 A | 9/1998 | Vo et al. |
| 5,815,816 A | 9/1998 | Isumi |
| 5,822,700 A | 10/1998 | Hult et al. |
| 5,826,185 A | 10/1998 | Wise |
| 5,828,740 A | 10/1998 | Khuc et al. |
| 5,850,599 A | 12/1998 | Seiderman |
| 5,854,975 A | 12/1998 | Fougnies |
| 5,905,736 A | 5/1999 | Ronen et al. |
| 5,920,821 A | 7/1999 | Seazholtz et al. |
| 5,930,701 A | 7/1999 | Skog |
| 5,940,755 A | 8/1999 | Scott |
| 5,943,399 A | 8/1999 | Bannister et al. |
| 5,946,629 A | 8/1999 | Sawyer et al. |
| 5,946,630 A | 8/1999 | Willars et al. |
| 5,950,130 A | 9/1999 | Coursey |
| 5,953,398 A | 9/1999 | Hill |
| 5,974,054 A | 10/1999 | Couts et al. |
| 5,974,133 A | 10/1999 | Fleischer, III |
| 5,978,685 A | 11/1999 | Laiho |
| 5,983,091 A | 11/1999 | Rodriguez |
| 5,987,323 A | 11/1999 | Huotari |
| 5,998,111 A | 12/1999 | Abe |
| 5,999,811 A | 12/1999 | Molne |
| 6,026,292 A | 2/2000 | Coppinger |
| 6,029,062 A | 2/2000 | Hanson |
| 6,035,025 A | 3/2000 | Hanson |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen et al. |
| 6,075,982 A | 6/2000 | Donovan et al. |
| 6,081,508 A | 6/2000 | West et al. |
| 6,101,378 A | 8/2000 | Barabash et al. |
| 6,115,458 A | 9/2000 | Taskett |
| 6,122,503 A | 9/2000 | Daly |
| 6,122,510 A | 9/2000 | Granberg |
| 6,122,520 A | 9/2000 | Want et al. |
| 6,144,653 A | 11/2000 | Persson |
| 6,148,197 A | 11/2000 | Bridges et al. |
| 6,148,198 A | 11/2000 | Anderson et al. |
| 6,149,353 A | 11/2000 | Nilsson |
| 6,157,823 A | 12/2000 | Fougnies |
| 6,157,831 A | 12/2000 | Lamb |
| 6,169,891 B1 | 1/2001 | Gorham et al. |
| 6,173,181 B1 | 1/2001 | Losh |
| 6,181,935 B1 | 1/2001 | Gossman et al. |
| 6,188,752 B1 | 2/2001 | Lesley |
| 6,189,031 B1 | 2/2001 | Badger |
| 6,192,241 B1 | 2/2001 | Yu |
| 6,195,543 B1 | 2/2001 | Granberg |
| 6,198,431 B1 | 3/2001 | Gibson |
| 6,199,045 B1 | 3/2001 | Giniger et al. |
| 6,205,330 B1 | 3/2001 | Winbladh |
| 6,208,854 B1 | 3/2001 | Roberts et al. |
| 6,216,008 B1 | 4/2001 | Lee |
| 6,219,669 B1 | 4/2001 | Haff |
| 6,223,042 B1 | 4/2001 | Raffel |
| 6,223,046 B1 | 4/2001 | Hamill-Keays et al. |
| 6,226,529 B1 | 5/2001 | Bruno et al. |
| 6,249,680 B1 | 6/2001 | Wax et al. |
| 6,249,744 B1 | 6/2001 | Morita |
| 6,266,614 B1 | 7/2001 | Alumbaugh |
| 6,289,373 B1 | 9/2001 | Dezonno |
| 6,311,055 B1 | 10/2001 | Boltz |
| 6,317,594 B1 | 11/2001 | Gossman et al. |
| 6,327,479 B1 | 12/2001 | Mikkola |
| 6,335,968 B1 | 1/2002 | Malik |
| 6,356,630 B1 | 3/2002 | Cai |
| 6,370,242 B1 | 4/2002 | Speers |
| 6,373,930 B1 | 4/2002 | McConnell |
| 6,381,316 B2 | 4/2002 | Joyce |
| 6,393,269 B1 | 5/2002 | Hartmaier |
| 6,396,913 B1 | 5/2002 | Perkins et al. |
| 6,397,055 B1 | 5/2002 | Mchenry |
| 6,408,177 B1 | 6/2002 | Parikh |
| 6,442,257 B1 | 8/2002 | Gundlach |
| 6,473,622 B1 | 10/2002 | Meuronen |
| 6,480,710 B1 | 11/2002 | Laybourn |
| 6,483,907 B1 | 11/2002 | Wong |
| 6,490,450 B1 | 12/2002 | Batni |
| 6,529,593 B2 | 3/2003 | Nelson |
| 6,529,732 B1 | 3/2003 | Vainiomaki |
| 6,587,688 B1 | 7/2003 | Chambers |
| 6,587,691 B1 | 7/2003 | Granstam |
| 6,728,353 B1 | 4/2004 | Espejo et al. |
| 6,771,971 B2 | 8/2004 | Smith |
| 6,856,804 B1 | 2/2005 | Liotta |
| 6,915,138 B2 | 7/2005 | Kraft |
| 6,961,330 B1 | 11/2005 | Cattan et al. |
| 7,116,972 B1 | 10/2006 | Zhang |
| 7,120,418 B2 | 10/2006 | Herajarvi |
| 7,127,264 B2 | 10/2006 | Hronek |
| 7,154,901 B2 | 12/2006 | Chava |
| 7,181,538 B2 | 2/2007 | Tam |
| 7,328,031 B2 | 2/2008 | Kraft |
| 7,356,328 B1 | 4/2008 | Espejo |
| 8,087,068 B1* | 12/2011 | Downey .............. H04L 63/083 726/4 |
| 2001/0006889 A1 | 7/2001 | Kraft |
| 2001/0040949 A1 | 11/2001 | Blonder |
| 2001/0041579 A1 | 11/2001 | Smith |
| 2002/0103762 A1 | 8/2002 | Lopez |
| 2002/0116263 A1 | 8/2002 | Gouge |
| 2002/0118800 A1 | 8/2002 | Martinez et al. |
| 2002/0119793 A1 | 8/2002 | Geil |
| 2003/0051041 A1 | 3/2003 | Kalavade |
| 2003/0172272 A1* | 9/2003 | Ehlers ................ H04L 63/0853 713/170 |
| 2004/0030659 A1 | 2/2004 | Gueh |
| 2004/0078340 A1* | 4/2004 | Evans .................... G06Q 20/10 705/64 |
| 2004/0259531 A1 | 12/2004 | Wood |
| 2005/0101338 A1 | 5/2005 | Kraft |
| 2005/0141522 A1 | 6/2005 | Kadar |
| 2005/0186974 A1 | 8/2005 | Cai |
| 2005/0265536 A1 | 12/2005 | Smith |
| 2005/0273442 A1* | 12/2005 | Bennett ............. G06Q 20/3674 705/67 |
| 2006/0053197 A1 | 3/2006 | Yoshimura |
| 2006/0094403 A1* | 5/2006 | Norefors ................ G06F 21/35 455/411 |
| 2007/0101411 A1* | 5/2007 | Babi ..................... G06Q 10/06 726/4 |
| 2008/0098225 A1* | 4/2008 | Baysinger ............ H04L 63/083 713/171 |
| 2011/0151852 A1 | 6/2011 | Olincy |

OTHER PUBLICATIONS

Cellular Mobile Pricing Structures and Trends; Dr. Sam Paltridge of the OECD's Directorate for Science, Technology and Industry; Dist.: May 19, 2000 (Nov. 1999).

(56) References Cited

OTHER PUBLICATIONS

Newsletter "Sonera Bill Warning" Digital Cellular Report. Stevenage: Jun. 17, 1998. vol. 4, Iss.; p. 1.

* cited by examiner

LOGIN SECURITY WITH SHORT MESSAGING

This application is a continuation of U.S. application Ser. No. 12/591,935, filed Dec. 4, 2009, entitled "Login Security with Short Messaging", now U.S. Pat. No. 8,712,453; which claims priority from U.S. Provisional Patent Application 61/193,792, filed Dec. 23, 2008, entitled "Login Security with Short Messaging", the entirety of both of which are expressly incorporated herein by reference.

BACKGROUND OF THE INVENTION

1. Field of the Invention

This invention relates generally to wireless telecommunication. More particularly, it relates to short messaging use as a security tool.

2. Background of the Related Art

Current on-line accounts rely on a strong password to prevent intruders from gaining access to an account. Some passwords require that they include both numbers and letters, and/or some require that they be of at least a given number of characters, e.g., at least 8 characters long, all to improve security, although that makes a password more difficult to recall. To assist, in the event of a forgotten password, a user may request that their password be sent to an email address registered when the account was initialized.

However, in the event that a proper password IS entered by an apparent user, conventional on-line account systems presume that the user is authorized. In this event, an unauthorized intruder into an on-line account may have hours to 'play' with the account, and may even be able to repeatedly return to the online account before the breach has been noticed and the password changed by a user of the online account.

SUMMARY OF THE INVENTION

In accordance with the principles of the present invention, a login module for an on-line server comprises a user/password authenticator to receive a user/password request including a user ID and a password, to authenticate access to an on-line account associated with the on-line server. A short message login notifier generates a short message login notification message informing a user of receipt of the user/password request. A short message router transmits the short message login notification message to a pre-registered short message address via a short message servicing center (SMSC).

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

The present invention provides additional security applied to on-line accounts to that otherwise conventionally provided by, e.g., longer passwords, passwords that include both characters and numbers, etc., by implementing an on-line server that notifies a pre-registered account holder via a short messaging system (SMS) with a short message login notification when a log-in (or even just a login attempt) occurs. Thus, in accordance with the principles of the present invention, even entry of the proper user/password information, which would conventionally be presumed to be authorized, will be notified to the registered SM address of the authorized user.

The present inventor has appreciated that an online account holder may likely be unaware of an intrusion into their account when the unauthorized user knows, guesses, or otherwise discovers and uses the correct password. Such an unknowing user may be in the dark until they log-in and happen to discover at that later time any damage done to the account. Some damage (such as information gleaned to be used for identity fraud or the like) may not be known at all, or at least not until a much later time.

In accordance with the principles of the present invention, the amount of time that an unauthorized intruder is allowed to access a breached on-line account, if at all, is minimized. Accordingly any benefit or profit to the intruder is minimized, as is the amount of damage to the true on-line account holder.

Figure 1:
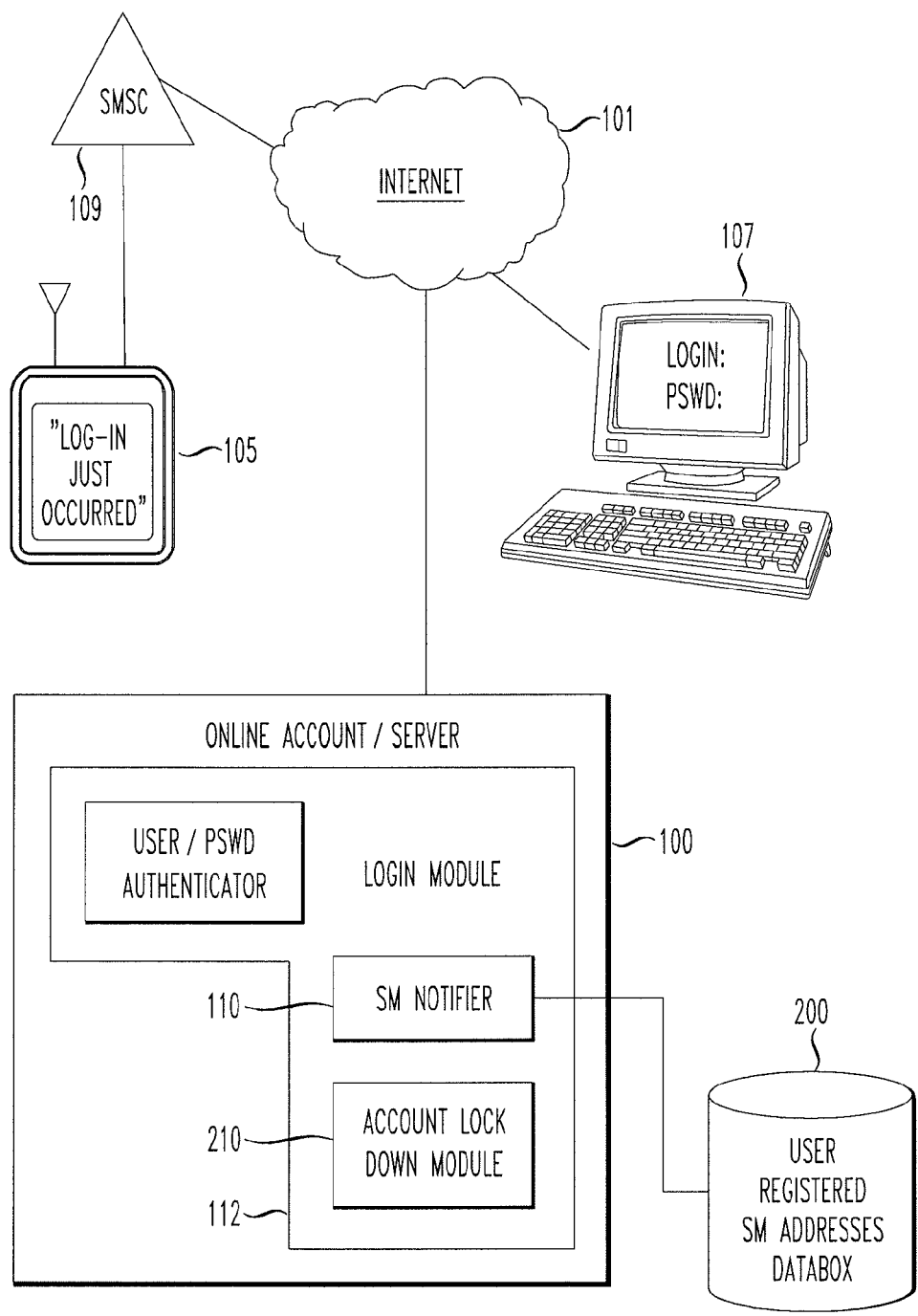
FIG. 1 depicts an exemplary on-line account server including a login module that generates a short message login notification upon detection of a login or login attempt, and an on-line account lock-down module, in accordance with the principles of the present invention.

FIG. 1 depicts an exemplary on-line account server including a login module that generates a short message login notification upon detection of a login or login attempt, and an on-line account lock-down module, in accordance with the principles of the present invention.

In particular, as shown in FIG. 1, a user is presumed to be away from an on-line account, but accessible to a short messaging device 105, serviced via a short message servicing center 109 of an appropriate service provider who has access to the Internet 101. An intruder at a computer 107 or other device in communication with the Internet 101 accesses an on-line account serviced by an on-line account server 100. However, importantly, the on-line account server 100 includes a login module 112 that includes at least a short message login notifier 110, and optionally an account lock-down module 210.

The present inventor has appreciated that short messaging is very quick, often even quicker than email, particularly in the way that it is presented to the user. Many phones are set to vibrate and/or let out a short audio burst upon receipt of a short message, notifying the user quickly. Email is a more passive system occasionally logged in and checked by a user. Even a push email system such as that provided by Blackberry™ devices pushes on a periodic basis (e.g., every 15 minutes), allowing precious minutes to pass while an intruder explores a user's on-line account. Many on-line accounts can be compromised in under a minute or just a few minutes, particularly to an experienced hacker.

A full understanding of the operation of the short message login notifier 110 and account lock-down module 210 will be gleaned from a description of their preferred operation. To this end, FIG. 2 shows an exemplary process of sending a short message login notification upon detection of a login or login attempt, in accordance with the principles of the present invention.

Figure 2:
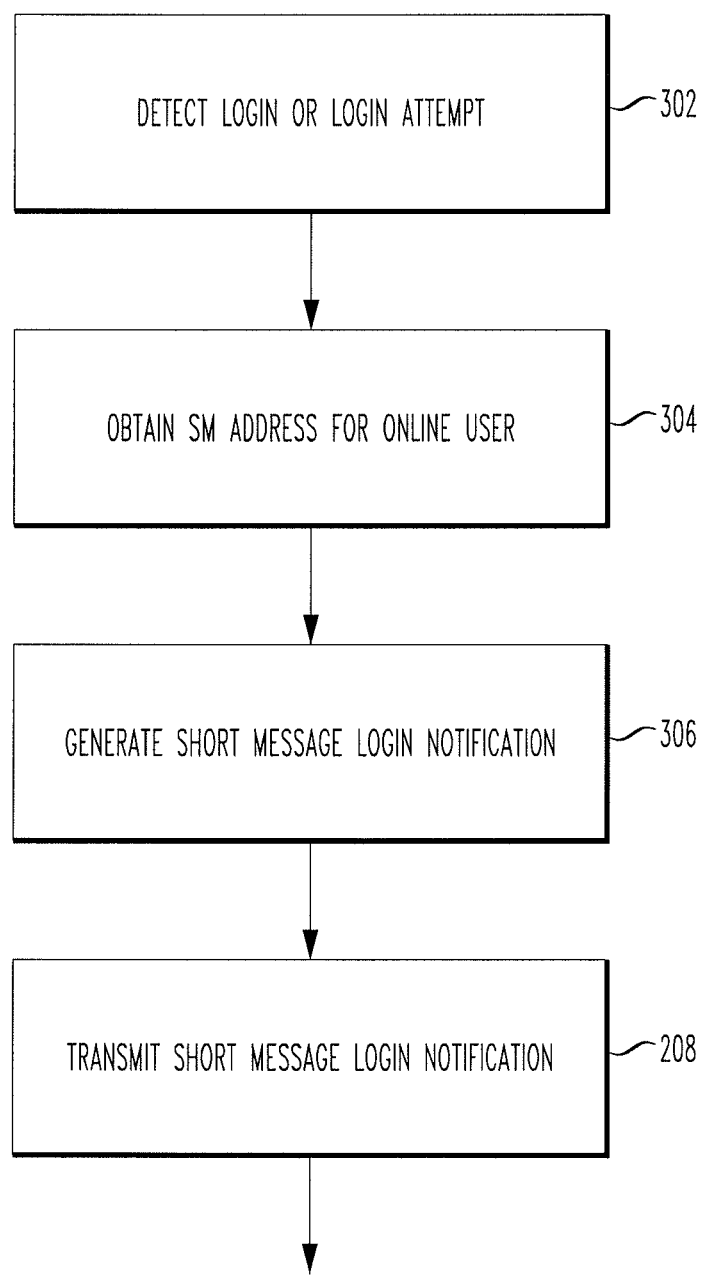
FIG. 2 shows an exemplary process of sending a short message login notification upon detection of a login or login attempt, in accordance with the principles of the present invention.

In particular, as shown in step 302 of FIG. 2, a login or login attempt is detected in an on-line account of a user.

In step 304, the preferred short message address for the user pre-registered and associated with the relevant on-line account being logged into is obtained.

In step 306, a suitable short message login notification is generated.

In step 308, the generated short message login notification is transmitted.

Short message notification to a registered SM address upon a proper login empowers a user to affect an immediate lock-down of the accessed on-line account if necessary should the long-in be unauthorized or otherwise improper.

The short message may simply notify the user of a proper login into their on-line account, or additional information may be included, e.g., time of day, number of login attempts, etc.

In most cases, the SM address will be the phone number of the authorized user.

In this way the proper on-line account holder is notified quickly about the login, and thus is empowered to quickly respond to an unauthorized access to their on-line account.

Figure 3:
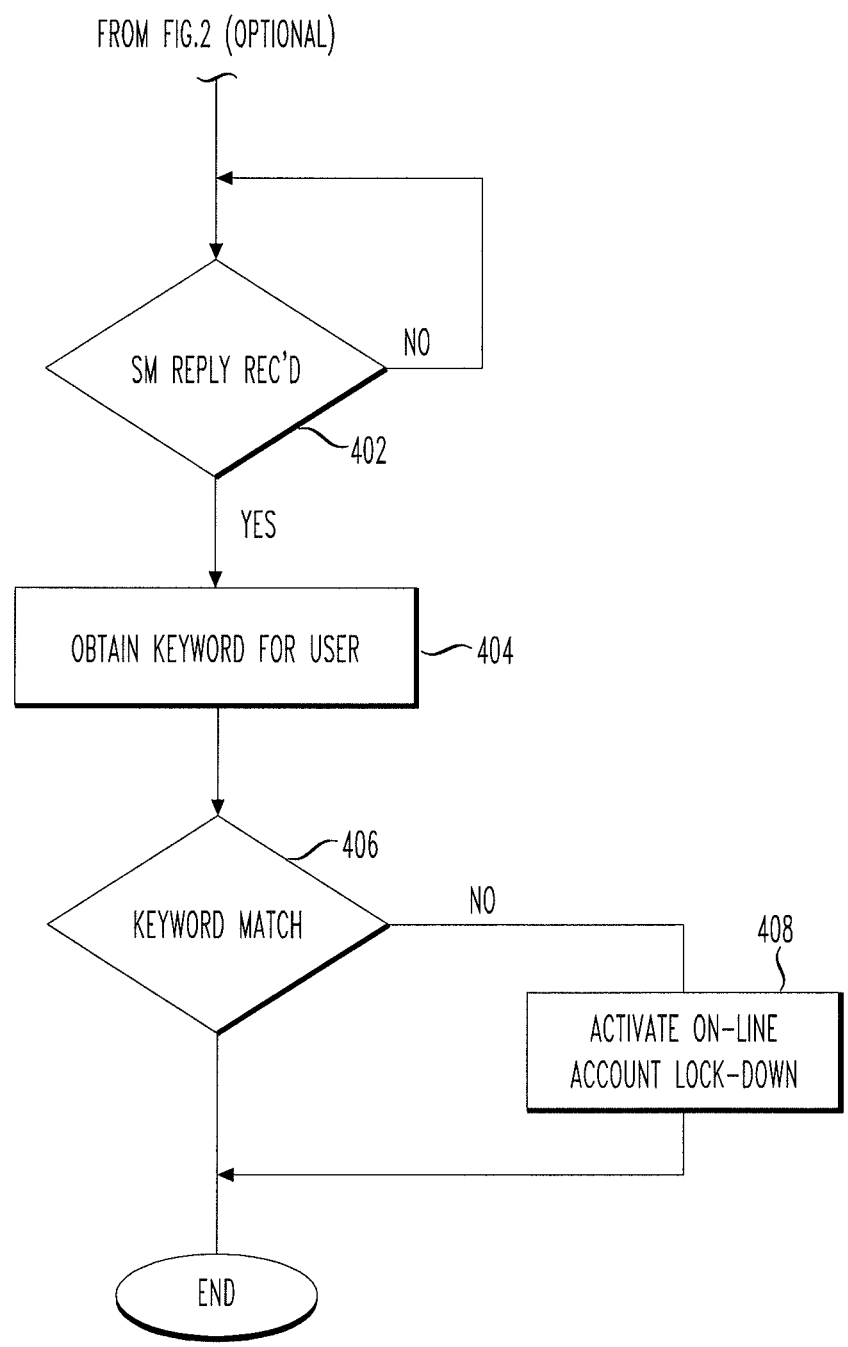
FIG. 3 shows an exemplary process of permitting on-line account access only after receipt of a short message reply to the short message login notification, in accordance with the principles of the present invention.

FIG. 3 shows an exemplary process of permitting on-line account access only after receipt of a short message reply to the short message login notification, in accordance with the principles of the present invention.

In particular, as shown in an additional embodiment of FIG. 3, an acknowledgement procedure may be required by a return short message from the registered user permitting access to the on-line account to continue. Access to the on-line account may be held until the acknowledgement is received. However, to provide a more seamless user experience, the access to the on-line account may be permitted immediately upon a proper login, but may be subject to cessation after a given amount of time should a return short message acknowledgement not be received from the user after a given period of time, e.g., after 1 minute.

Step 402 optionally follows from step 308 of FIG. 2. In step 402 of FIG. 3, a short message reply to the received short message login notification is received from the registered user. The procedure preferably loops until a short message reply is received (with an appropriate time out as desired by the system operator).

Upon receipt of a short message reply, as depicted in step 404, the pre-registered key word for the relevant user is obtained from the user registered short message address database 200.

In step 406, the obtained pre-registered key word from the database is compared to the key word contained in the received short message reply. If a match is not found, the security login notification procedure is completed and full access to the on-line account is permitted unfettered. However, if a match is found (indicating a desire of the user to lock-down their on-line account), the account lock down module 210 is activated to lock-down the on-line account from access by the user.

In yet another embodiment, a short message login notification may be sent to the pre-registered user after each login attempt. Thus, if the would-be hacker isn't successful on their first attempt, a registered user would have an even greater chance of locking down their on-line account before the hacker succeeds.

Quick notification to an account holder of an on-line account being accessed (i.e., a successful login) reduces the amount of time an unauthorized intruder has to damage or otherwise misappropriate the online account.

In accordance with the principles of the present invention, an on-line account server 100 or associated hardware is loaded with a login module 112 that handles login from a user (whether an authorized user or not).

Upon a successful login, or after each login attempt, a short message login notifier module 110 obtains the registered SM address from a suitable user registered short message address database 200, and formulates and transmits an appropriate short message login notification to the registered address of the user.

Thus, preferably each successful login results in the generation of a short message login notification to the registered account holder's short message address (as registered when the on-line account was initialized). If in fact it is not the proper account holder that is making the login attempt(s), an account lock down module 210 springs into action with a simple short message reply to the received short message login notification.

To ensure that lock-down of the on-line account happens only upon a necessary situation, the registration of the on-line user may include a key word that would permit the immediate lock-down of the on-line account. Upon receipt of a reply short message in reply to the short message login notification of a login to the on-line account, if the pre-registered lock-down key word is correct the on-line account would be locked down to prevent the unauthorized intruder/hacker from doing any additional damage to the users on-line account.

In variations, a reply to the short-message may be required before allowing the login to proceed. Alternatively, limited functionality may be permitted in the on-line account without the reply message, with full functionality being permitted once a reply short message has been received and reported to the short message notifier 110 and/or account lock down module 210.

Thus, in accordance with the principles of the present invention, in association with an on-line account, a successful login generates a short-message login notification to a pre-registered user's short message address (phone number) indicating that a login to their on-line account has been attempted or accomplished. Preferably the short message login notification includes identification of the on-line account, and any other information desired by either the system operator and/or the user via pre-configuration of their on-line account.

Other variations of the principles of the present invention include: (1) the on-line account accepts the login, but with limited functionality until a 'key word' short message reply is received; and (2) the on-line account waits for a short message reply to the short-message login notification allowing the login sequence to be completed.

In accordance with the principles of the invention, if the on-line account holder is not expecting a login, a quick 'key word' short message reply to the received short-message login notification causes the on-line account lock-down module 210 to force an immediate lock-down of the on-line account, locking out the unauthorized intruder (as well as the authorized user). The on-line account may be re-established by the provider upon suitable re-authorization.

The present invention provides extremely high security, e.g., high security access to buildings, etc., where the subject must have both a 'key card' and an 'access code' (or finger print, retinal pattern). It also provides a 'doogle' plugged into an access port of a computer to run a selected application.

The present invention has particular applicability to, e.g., on-line gaming applications, and/or on-line accounting applications, etc.

While the invention has been described with reference to the exemplary embodiments thereof, those skilled in the art will be able to make various modifications to the described embodiments of the invention without departing from the true spirit and scope of the invention.

What is claimed is:

1. A method of providing notification of a login to an online server, comprising:
   generating a short message login notification message providing notification of a proper login to an on-line account; and
   transmitting said short message login notification message to a preregistered short message address, via a physical short message servicing center (SMSC), associated with a physical short messaging device;
   wherein said proper login to said on-line account is accepted, but with limited functionality until an authorizing reply to said short message login notification message is received.

2. The method of providing notification of a login to an online server according to claim 1, further comprising:
   locking down said on-line account upon receipt of an appropriate short message reply to said short message login notification.

3. The method of providing notification of a login to an online server according to claim 2, further comprising:
   authenticating said short message reply when a send address of said short message reply matches said pre-registered short message address.

4. The method of providing notification of a login to an online server according to claim 2, further comprising:
   authenticating said short message reply when a pre-registered key word included in said short message reply matches a pre-registered lockdown key word.

* * * * *